8011X
R. Harrison,
Riding Saddle,
Patented Feb. 11, 1834.
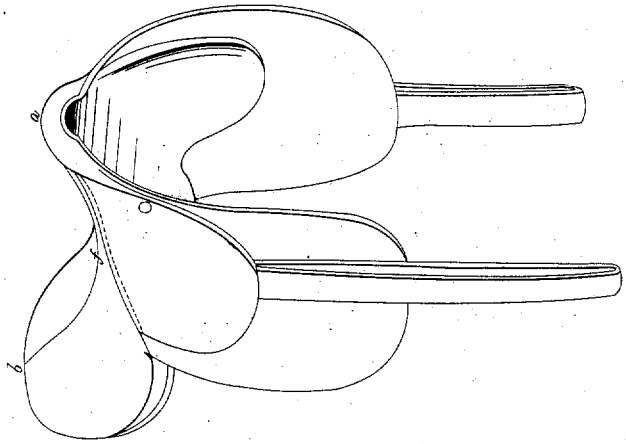
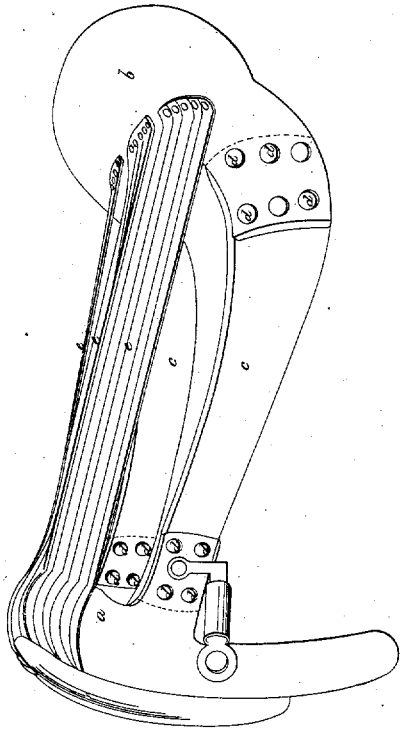
N. PETERS, PHOTO-LITHOGRAPHER, WASHINGTON, D. C.

ar. 74

Feb. 11. 1834

Richard Harrison. an alien . New York

Letters Patent

The schedule referred to in these Letters Patent and making part of the same containing a description in the words of the said Richard Harrison him self of his improvement in manufacturing Spring Riding saddles.

To all to whom these presents shall come. Be it Known that I Richard Harrison an alien a subject of the King of Great Britain but for more than two years past a resident within the United States and now of the City County and State of New York have invented a new and useful improvement in the mode of manufacturing Spring Riding saddles: and that the following is a full and exact description of the construction and operation of the said improved Spring saddle as improved by me. Which I call Harrisons Patent whale bone Spring Riding saddle. The external shape and appearance of the saddle are not changed by my improvements. My improvement consists in substituting in that part of the saddle tree or frame which is called the bars of the saddle - whale bone springs or bars in the place of steel or other springs or bars or in the place of other wooden sides or bars of the common Pad saddle.

The patent whale Bone spring riding saddle may be manufactured in the following manner to wit' Take the tree or frame of the common pad Riding Saddle and cut out of it the bars or sides leaving only the head of the saddle tree and the back part of the frame called the cantle retaining a sufficient portion of that part of the bars or sides of the frame near the cantle which is called the belly of the saddle, to give the saddle its usual circular form and shape. In the places of the bars or sides of the saddle tree so removed and in lieu of steel or other springs I substitute bars of Whale bone, fastening the Whale bone bars at each end firmly to the sides of the head and cantle. of the saddle by screws rivets or other suitable fastenings placing the Whale bone bars as nearly as possible in the places of the wooden [illegible] which have been removed. These Whale Bone bars should be in saddles of the ordinary size. from about twelve to sixteen inches in length and about [illegible] breadth and about half an inch in thickness and it is prefer able to have each bar or spring made of one entire piece of whalebone although
the springs may be made of pieces or layers. These proportions may be varied
somewhat according to the size and strength requisite in the saddle to be
constructed. A suitable number of strips of webbing are then attached to
the frame or tree thus made the webbing running and being stretched tight
ly from the head or front of the saddle to the cantle or under part so that
when a person is seated on the saddle the weight produced thereby acting
upon the webbing so attached to the head and cantle of the saddle cau
ses the whalebone bars and springs to act and react by the motion of the
Horse. Thus affording by their elasticity great ease to the Horse and rider.
The sizes and proportions of the parts of the saddle may be varied as con
venience may require. The saddle is covered and finished in the man
ner of the ordinary spring and other Riding Saddles — The Patent whale
bone spring Saddle may be constructed also in another manner by making the head
of the saddle tree and also the cantle or back part of the tree in separate
parts or pieces and connecting them by the whalebone bars or springs of
suitable size in the manner above described.
The advantage of the Patent whale bone Spring Riding Saddle consist in its
not being liable to rust or loose its elasticity as is the case with the steel
spring saddle; in its being consequently more durable and economical
in its superior ease and comfort to the rider and horse, and from its per
manent elastic qualities not being liable to break or become stiff and
hard as is the case with the steel spring and the common pad saddle.
What I claim particularly and solely as my improvement and inven
tion consists in the substitution of whale bone bars or springs in the tree
or frame of the saddle in the place of wood steel or any other material here
tofore used in riding saddles — In testimony that the above is a true
specification of my said improvement as above described I have hereun
to set my hand at the City of New York this 31st day of August in
the year of our Lord 1838.

Richard Harrison

Witness
John H Raymond
John B Staples 40.187

Exd [illegible]